United States Patent
Gambhir et al.

(10) Patent No.: US 11,991,059 B1
(45) Date of Patent: May 21, 2024

(54) TECHNIQUES FOR GENERATING SERVICE-SPECIFIC SERVER HEALTH SCORES AND APPLICATION TRAFFIC FORECASTS

(71) Applicant: Microsoft Technology Licensing, LLC, Redmond, WA (US)

(72) Inventors: Prerana Dharmesh Gambhir, San Jose, CA (US); Sharena M. Pari-Monasch, Union City, CA (US); Qiong Zhou, Cupertino, CA (US); Thanh Trung Nguyen, Bellevue, WA (US); Sarah Ferraro Stein, Sunnyvale, CA (US); Christine Bumpous, Renton, WA (US); Daniel M. Cheung, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/083,255

(22) Filed: Dec. 16, 2022

(51) Int. Cl.
| | |
|---|---|
| *G06F 15/173* | (2006.01) |
| *H04L 41/16* | (2022.01) |
| *H04L 43/045* | (2022.01) |
| *H04L 43/062* | (2022.01) |
| *H04L 43/067* | (2022.01) |

(52) U.S. Cl.
CPC ............ *H04L 43/067* (2013.01); *H04L 41/16* (2013.01); *H04L 43/045* (2013.01); *H04L 43/062* (2013.01)

(58) Field of Classification Search
CPC ...... H04L 43/067; H04L 41/16; H04L 43/045
See application file for complete search history.

(56) References Cited

U.S. PATENT DOCUMENTS

| | | | |
|---|---|---|---|
| 11,516,070 B1 * | 11/2022 | Shemer | H04L 41/5025 |
| 2015/0195149 A1 * | 7/2015 | Vasseur | H04L 47/2425 370/252 |
| 2017/0006059 A1 * | 1/2017 | Meulenhoff | H04L 63/1458 |
| 2017/0353991 A1 * | 12/2017 | Tapia | H04W 24/02 |
| 2019/0020555 A1 | 1/2019 | Tayal | |
| 2020/0364128 A1 * | 11/2020 | Vittal | G06F 11/3055 |
| 2020/0364561 A1 * | 11/2020 | Ananthanarayanan | G06N 20/00 |
| 2020/0379529 A1 * | 12/2020 | Le Goff | G01K 1/022 |
| 2022/0383324 A1 | 12/2022 | Sheshadri | |

OTHER PUBLICATIONS

International Search Report and Written Opinion received for PCT Application No. PCT/US2023/079932, Mar. 12, 2024, 14 pages.

* cited by examiner

*Primary Examiner* — Padma Mundur
(74) *Attorney, Agent, or Firm* — Schwegman Lundberg & Woessner, P.A.

(57) ABSTRACT

Described herein are supervised machine learning techniques for generating a first machine learned model, which receives, as input, values for a set of utilization metrics for a server computer and generates, as output, a service-specific health score for the server computer, and for generating a second machine learned model, which receives, as input, values for the volume of application traffic directed to a group of server computers hosting the service for each of several prior time periods and generates, as output, an application traffic forecast for the group of server computers, for a future time period.

20 Claims, 8 Drawing Sheets

TECHNIQUES FOR GENERATING SERVICE-SPECIFIC SERVER HEALTH SCORES AND APPLICATION TRAFFIC FORECASTS

TECHNICAL FIELD

The present application generally relates to supervised machine learning techniques for use in generating a service-specific "health" score for each server computer in a group of server computers hosting a particular service, and an application traffic forecast for the group of server computers hosting the service. Furthermore, the individual health scores and the application traffic forecast are used, in combination, as inputs to a rules-based engine that evaluates various rules to generate and present proactive recommendations concerning the deployment of the service and the routing of the application traffic directed to the service.

BACKGROUND

Figure 1:
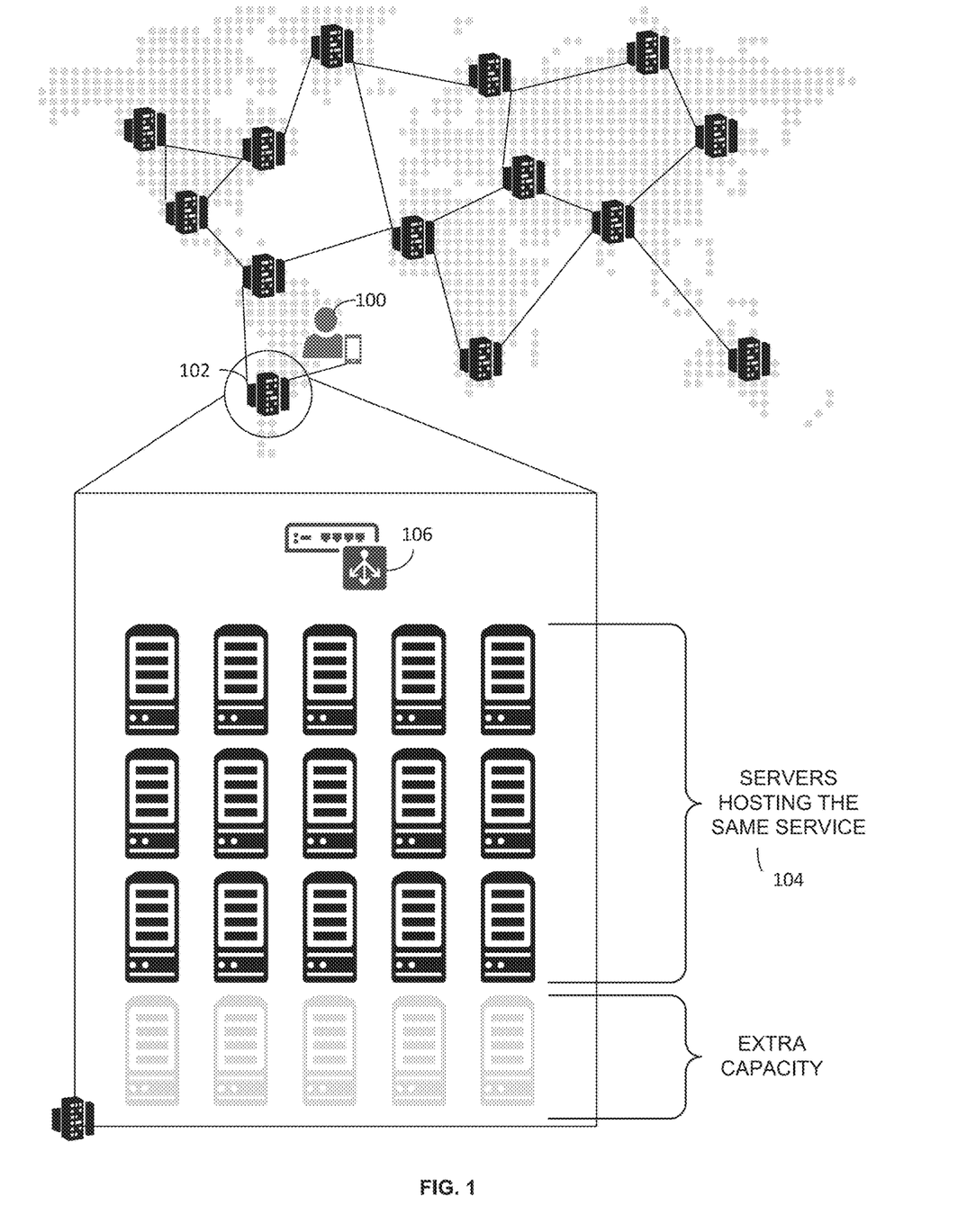
FIG. 1 is a diagram illustrating an example of a service being hosted by a plurality of server computers, at a plurality of datacenters.

In order to efficiently serve an extremely large number of end-users dispersed across a vast geographical area, many online or web-based applications or services, including applications offered as a service, are deployed to multiple server computers across multiple datacenters. For example, and with reference to FIG. 1, when an end-user 100 invokes a request to access a specific service, the request may be directed to the datacenter 102 that is geographically closest to the location of the end-user. At any one datacenter 102, each of several server computers 104 may be configured similarly to execute a separate instance of the same service. For example, as illustrated in FIG. 1, a group of server computers 104 in the datacenter 102 have been configured to execute the same service. As incoming application traffic directed to the service is received at the datacenter 102, a load balancer 106 may be used to distribute the application traffic to one of the many server computers 104 hosting the specific service, thereby balancing the distribution of application traffic and the overall utilization of the server computers.

Deploying, maintaining and operating multiple server computers across multiple datacenters can be an extremely costly endeavor. As there is a cost associated with the operation of each server computer, optimizing for costs generally involves deploying the service to an appropriate number of server computers, given the expected level of application usage (e.g., application traffic). For example, if the service is deployed to too many server computers in any one data center, each server computer hosting the service will be underutilized, resulting in higher overall costs than would otherwise be necessary. However, if the service is deployed to too few server computers in any one datacenter, there is a risk that one or more server computers will be overburdened with application traffic, and as a result, experience performance degradation or even outright failure, thereby negatively impacting the end-user experience.

BRIEF DESCRIPTION OF THE DRAWINGS

Embodiments of the present invention are illustrated by way of example and not limitation in the figures of the accompanying drawings, in which.

DETAILED DESCRIPTION

Described herein are methods and systems, which leverage supervised machine learning techniques for generating a service-specific "health" score for each server computer in a group of server computers hosting the same service, and for generating an application traffic forecast for the group of server computers. The individual health scores and the application traffic forecast are provided as inputs to a rules-based engine, which uses the inputs to evaluate various rules for the purpose of deriving proactive recommendations concerning the deployment of the service and the routing of application traffic. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

For purposes of the present disclosure, the term "service" is used in reference to software code that is installed on and executed by a server computer. An end-user may use a software application (e.g., a web browser application) executing on any of a wide variety of client computing devices to access a server-based service. Accordingly, the combination of the application and service may be commonly referred to as an online application, or a web-based application. In any case, the term "application traffic" is used herein in reference to the data communicated over a network between the application, executing on a client computing device, and an instance of the service, executing on a server computer.

One of the more efficient mechanisms for controlling the costs associated with the deployment of an online service for use by a large number of end-users dispersed across a vast geographical area involves implementing server computer capacity adjustments within a particular datacenter or within some combination of datacenters comprising a pre-defined region. In this context, adjusting server computer capacity involves increasing or decreasing the number of individual server computers that are configured to host the service in order to meet the level of demand (e.g., the volume of application traffic) directed to the service by end-users in a given time period. For instance, if the level of application traffic directed to one datacenter decreases significantly over a period of time, decreasing the number of server computers hosting the service at that datacenter will make computing resources available for other needs (e.g., other applications and/or services), thereby decreasing the overall cost associated with providing the service. Similarly, if the level of application traffic directed to one datacenter increases significantly for a period of time, it may become necessary to deploy the service to additional server computers within the datacenter in order to successfully serve the increased application requests, without experiencing degradation in overall performance and negatively impacting the user experience.

Figure 2:
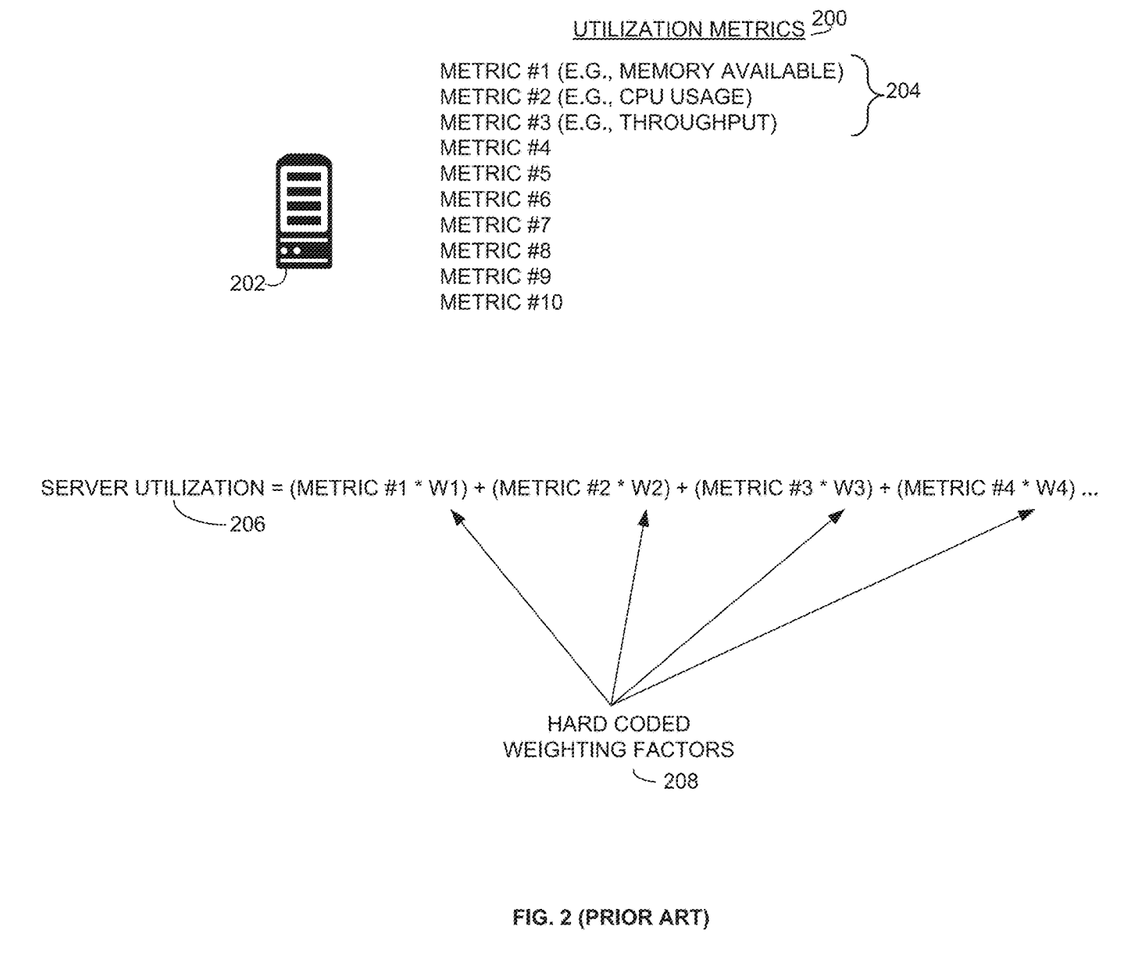
FIG. 2 is a diagram illustrating how a conventional health score may be derived as a weighted combination of various utilization metrics obtained from a server computer.

As illustrated in FIG. 2, one of the ways in which decisions are made concerning capacity adjustments—that is, the need to increase or decrease computing resources dedicated to a specific service—involves analyzing various utilization metrics 200 of each individual server computer 202 hosting a service. The number and nature of the utilization metrics that may be available to monitor in any given scenario may vary depending upon a variety of factors. However, as shown in FIG. 2, three common utilization metric types 204 involve some variation of metrics for available memory, central processing unit (CPU) usage, and throughput (e.g., a measure of requests processed in a particular unit of time). Of course, many other utilization metrics may be available, and any one service may have customized utilization metrics. While the example presented in FIG. 2 shows a total of ten utilization metrics, in any given scenario there may be more or less than ten utilization metrics.

One of the many challenges in using utilization metrics in making capacity adjustment decisions involves interpreting the meaning of the various utilization metrics. More specifically, it can be very difficult to know what value of a particular utilization metric represents a good (e.g., "healthy") indicator, and what value for a particular utilization metric indicates a potential server-related problem. Further complicating the issue, different server-based services will utilize different server computer resources at different levels. Accordingly, a range of values for a particular utilization metric for one server-based service may indicate a "normal" or "healthy" operational status, while the same range of values for another service may be indicative of a problem. Furthermore, server computers generally do not have any type of notification or logging system to indicate that a server computer is imminently going to shut down or "crash." Generally, an analyst or DevOps engineer is only able to ascertain that a server computer was over-burdened in some way, and thus experiencing performance degradation, by comparing one or more utilization metrics obtained through a system log with error codes or event logs indicating the non-performance or performance of various operations. Of course, this means that problems are identified only after they have occurred. Through the painstaking process of analyzing the logged utilization metrics in combination with error codes and event logs, an analyst may eventually come to understand what range of values of an individual utilization metric are reasonable and what range of values, or what threshold value, indicates a potential problem. However, as changes are made to a server-based service over time—for example, as the service is updated and modified to provide new and/or improved functionality—inevitably, these changes will impact how the value of the utilization metrics are to be interpreted.

When using utilization metrics to make server capacity adjustment decisions, another technical challenge is understanding which specific utilization metric, or which combination of metrics, may provide the best indicator(s) of the overall health of a server computer. For instance, as shown in FIG. 2, for any service executing on a server computer 202, there may be many different utilization metrics 200. While an out-of-range value for any one utilization metric may indicate a problem, it may be more beneficial to monitor the values of several utilization metrics.

One conventional technique for analyzing combinations of utilization metrics to make server capacity adjustment decisions involves using a weighted combination of utilization metrics as an overall server utilization score. For instance, as shown in FIG. 2, a server utilization score 206 may be derived as a weighted combination of some subset of available server utilization metrics. Here, the weighting factors (e.g., "W1," "W2," "W3," and "W4") 208 of each individual utilization metric may be established through experimentation, trial-and-error, and/or intuition. The weighting factor associated with each utilization metric represents the importance or contribution of that utilization metric to the overall server utilization score. Each individual weighting factor corresponding with an individual utilization metric is hard coded in the calculation of the overall server utilization score. As such, like any individual utilization metric, the problem with a server utilization score calculated in this manner is that it may be difficult to interpret in different situations—specifically, when different server computers are hosting different services. For example, the service architecture of one service may vary significantly from that of another, resulting in vastly different utilization levels of certain server resources. Some services may have significant CPU utilization, while other services may heavily consume memory resources. Some services may be heavily bottlenecked by web-socket connections, while other services may heavily utilize the graphic device interface (GDI), such that networking resources may be important. Accordingly, because different services will utilize different server computer resources at different levels, interpreting the meaning of a server utilization score for a first server computer hosting a first service will necessarily be different from interpreting the meaning of a server utilization score, calculated in the same way, for a second server computer hosting a second service.

Another of the many technical challenges involved in making server capacity adjustments to manage costs is understanding the application traffic expected to be directed to each group of server computers at each datacenter. This can be particularly challenging when, for any of a variety of reasons, the volume of application traffic varies by location and by time. For example, in many instances, a particular datacenter or a group of two or more datacenters in a generally similar location (e.g., same country, or region) may see different levels of application traffic as compared with other datacenters in different geographical locations. In general, there are a significant number of factors that are difficult to identify and predict, which can have an impact on the level of application traffic directed to a group of server computers hosting a specific service. The level of application traffic may vary significantly depending upon the day of the week, the month of the year, before or after holidays, and/or the season and so on.

Consistent with some embodiments of the present invention, a user interface associated with a rules-based engine provides a mechanism by which an analyst or DevOps engineer can request and view operational status information relating to a specific service that has been deployed to groups of server computers at different datacenters. By way of example, a DevOps engineer may, by interacting with a user interface, request that a service-specific server health score for each server computer in a group of server computers be generated and presented. The service-specific server health scores may be provided as input to the rules-based engine, in combination with data indicating an application traffic forecast, such that the evaluation of one or more rules by the rules-based engine may result in a proactive recommendation relating to the deployment of the service, and/or the routing of application traffic.

By way of example, if a predicted level of application traffic for a specific group of server computers executing a specific service indicates a substantial increase over a previously established baseline or threshold level of application traffic, a recommendation to deploy the service to additional server computers at a specific datacenter may be presented. Similarly, if one or more server computers have service-specific health scores that indicate that the server computers are experiencing performance degradation, are likely to experience performance degradation, or are generally at risk of outright failure, a recommendation to deploy the service to additional server computers may be presented. Alternatively, a recommendation to divert application traffic to another datacenter may be presented. Of course, if the level of application traffic is predicted to decrease and/or all server health scores indicate that the server computers are not experiencing any performance degradation, a recommendation may be made to decrease the number of server computers to which the service is deployed.

Advantageously, the server health scores that are provided as input to the rules-based engine are service-specific health scores, which are derived using multiple utilization metrics with a pre-trained machine learning model. Here, the term "service-specific" refers to the fact that the health scores for the server computers are derived using a machine learning model that has been trained using training data obtained from server computers executing the same service. Accordingly, if a datacenter has server computers dedicated to hosting and executing multiple services, multiple pre-trained machine learned models may be used—one model for each specific service.

Consistent with embodiments of the present invention, a first machine learned model is trained to receive, as input features, values for each of several utilization metrics obtained from a server computer that is executing a specific service. The pre-trained machine learned model generates, as output, a server health score for the server computer that is executing the specific service. The first machine learned model is a model that has been trained using training data obtained from one or more server computers executing the same service. As such, the score that is generated by the first pre-trained machine learning model is a customized score for the service that is being executed by the server computer.

Consistent with some embodiments, a service-specific server health score is generated for each of several server computers executing the same service. For instance, the server health scores for each server computer in a group of server computers executing the same service may be derived in response to an individual request, where the request is invoked via a user interface—for example, a dashboard, via which a visual representation of the health of one or more server computers may be presented. By interacting with the user interface, a DevOps engineer can specify the specific service for which the health scores are to be generated, and the specific group of server computers—as there may be several different predefined groups of server computers executing the same service.

In addition to generating a server health score for each server computer executing a specific service, consistent with some embodiments, a second machine learning model is used to receive, as input, a measure of application traffic directed to the group of server computers executing the service for each of several prior time periods. The second pre-trained machine learning model generates, as output, a measure of the anticipated or expected application traffic to be received by the group of server computers executing the service. The predicted level of application traffic is provided, in combination with the server health scores, to the rules-based engine, which evaluates various rules for the purpose of generating proactive recommendations. In general, a recommendation may involve a suggestion to increase or decrease the number of server computers hosting a specific service in order to satisfy an expectation of increased or decreased application traffic, or to offset an expectation concerning a server computer that is exhibiting poor performance, as indicated by a server health score. Additionally, a recommendation may involve a suggestion to divert application traffic from one group of server computers or one datacenter to another group of server computers or another datacenter. Other aspects of the various embodiments of the present invention will be readily apparent from the description of the figures that follows.

Service-Specific Server "Health" Scores

Figure 3:
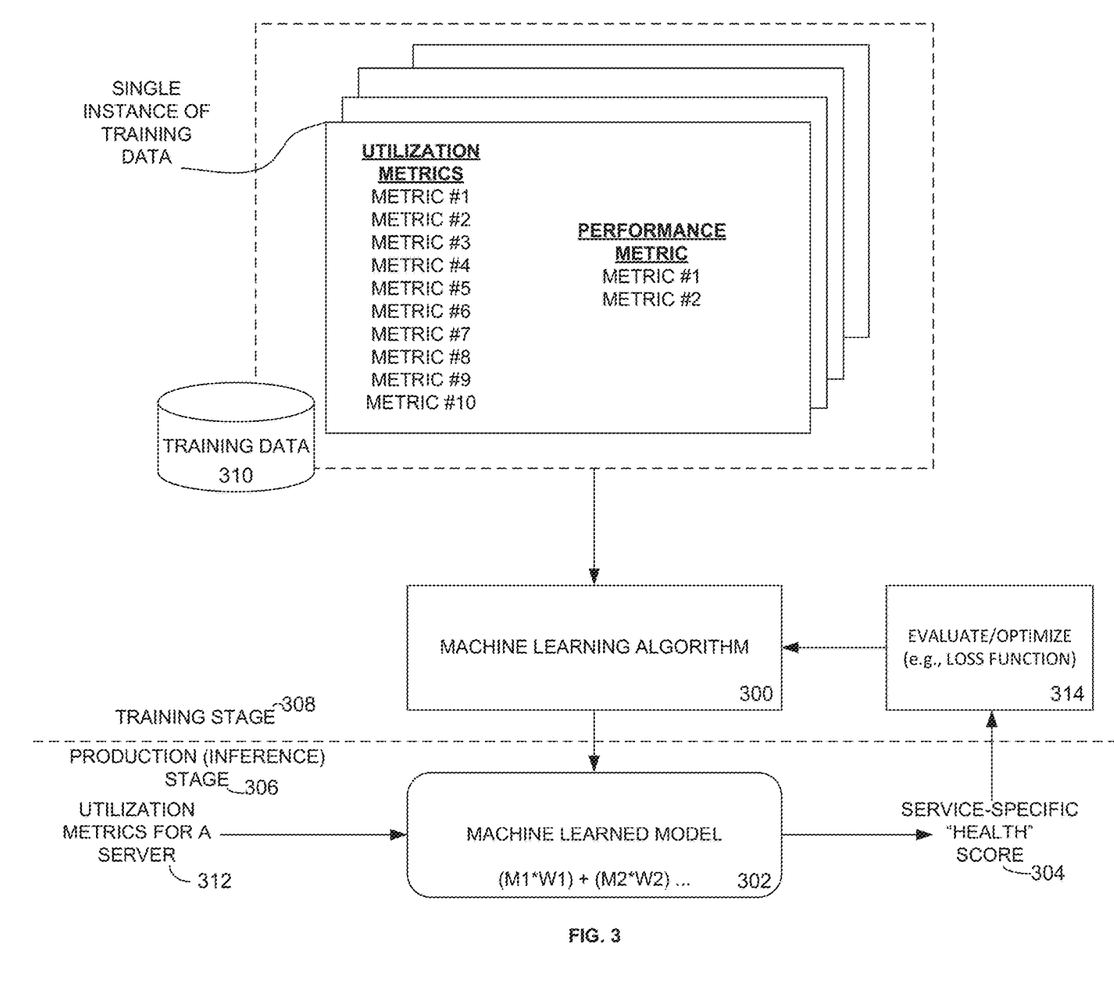
FIG. 3 is a diagram illustrating an example of how a supervised machine learning algorithm may be used to train a first machine learned model to derive as output a service-specific health score for a server computer hosting a specific service, consistent with embodiments of the invention.

FIG. 3 is a diagram illustrating an example of how a supervised machine learning algorithm 300 may be used to train a first machine learned model 302 to derive, as output, a service-specific health score 304 for a server computer hosting a specific service, consistent with embodiments of the invention. As shown in FIG. 3, before the machine learning model 302 can be deployed in a production setting or stage 306, the model 302 must first be trained during a training stage 308. To train the model 302, multiple instances of training data 310 are first obtained. Each instance of training data consists of a combination of utilization metrics obtained from one server computer, which serve as example inputs, and one or more performance metrics, which serve as an example output. The utilization metrics and the performance metrics are representative of the state of a server computer at a particular instance in time. Accordingly, as much as is practical, the value of each utilization metric and the value of the performance metric, for a single instance of training data, should be generated at or nearly at the same moment in time, or within some minimal duration of time. In some instances, a performance metric may be obtained from an event log or an error log and may indicate whether a specific task was completed successfully, or alternatively, whether an error code was logged to indicate that a task did not complete successfully. Accordingly, at least with some embodiments, the value of a performance metric may be binary—for example, where a first value indicates a particular operation completed successfully, and a second value indicates that a particular operation did not complete successfully.

In some instances, some analysis may be done to determine specific combinations of utilization metrics and performance metrics for use as training data. Specifically, the analysis may involve determining combinations of utilization metrics and performance metrics that are highly correlated. For instance, in some cases, certain performance metrics (e.g., certain logged error codes) may be more commonly observed in combination with certain ranges of values for some utilization metrics. As such, these specific metrics may be better at predicting the health of a server computer than other metrics. By way of example, a server computer executing a specific service may have a CPU utilization of between 30% and 35% when operating normally (e.g., healthy), such that few if any error codes are logged when the CPU utilization is in the specified range. However, when a CPU utilization of above 40% is observed, the same server computer may frequently log one or more errors to an event or error log. In such a case, the CPU utilization metric and the specific type of error code that is observed may be selected as the training data for the machine learning model. Accordingly, in situations where there may be a number of utilization metrics and performance metrics to choose from, some analysis may be done to determine the combination of utilization metrics and performance metrics that are highly correlated and have predictive value in determining the health score for a server computer executing the specific service.

Consistent with some embodiments, the machine learning algorithm 300 used to train the model 302 is referred to as a supervised machine learning algorithm or technique, as the training data 310 consists of positive examples and negative examples, where each example is a combination of example inputs (e.g., values for utilization metrics) and observed outputs (e.g., values for the performance metric). A positive example is a combination of values for utilization metrics (e.g., inputs) that correspond with a positive value of a performance metric. Similarly, a negative example is a is a combination of values for utilization metrics (e.g., inputs) that correspond with a negative value of a performance metric—that is, a value of a performance metric that indicates a problem has occurred.

In general, the objective in training the model 302 is to condition the model 302 to generate an appropriate output (e.g., an accurate health score for a server computer), upon processing a new set of input features 312—that is, a set of values for some combination of utilization metrics for a server computer that is executing the specific service to which the machine learning model relates. In some instances, conditioning the model means adjusting the weighting factors associated with each input feature—or, in the case of a neural network model, the individual neurons of each layer. During the training stage 308, after each single instance of training data is processed using the model 302 and an output 304 is generated by the machine learned model 302, the output 304 is evaluated 314 using a loss function, and then the machine learned model 302 is modified or updated to improve future predictions. This process is iteratively performed in succession with different instances of training data until the model is successful in deriving accurate health scores.

The specific type of machine learning model 302 that is used may vary from one embodiment to the next. However, some examples of the various types of machine learned models that may be utilized, consistent with various embodiments, include but are not limited to: a regression model, a decision tree model, a random forest model, and a neural network model.

Figure 5:
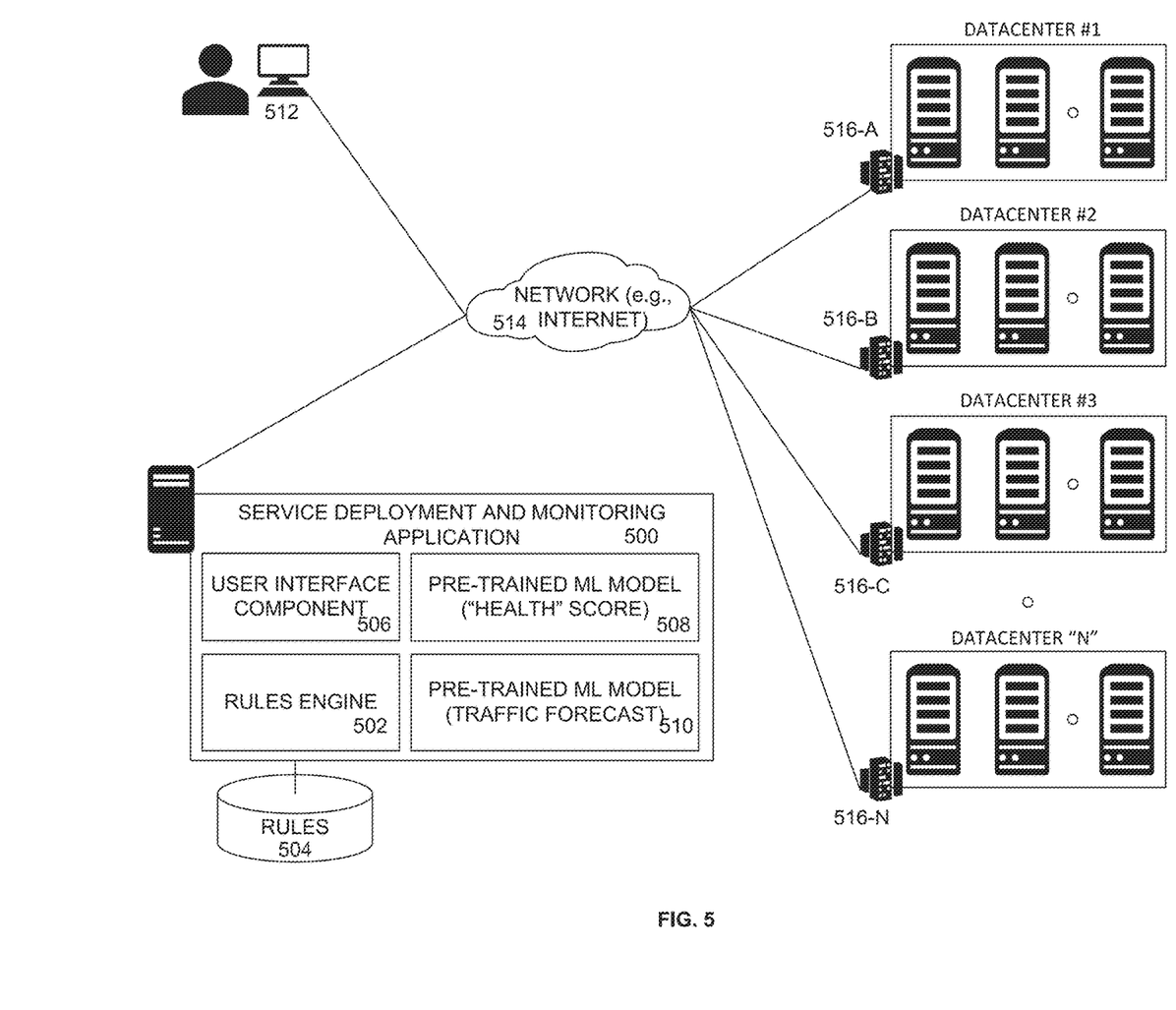
FIG. 5 is a diagram illustrating an example of a service deployment and monitoring application having a rules-based engine, which may be used to evaluate various rules for the purpose of generating proactive recommendations relating to the deployment of a service, consistent with some embodiments of the present invention.

Once the machine learned model 302 has been trained, the pre-trained machine learned model 302 is deployed in a production stage or setting 306. With some embodiments, the pre-trained machine learned model 302 is deployed to a server computer that hosts a service deployment and monitoring application (e.g., as shown in FIG. 5 and described further below). The service deployment and monitoring application may facilitate various user interfaces and tasks to aid an analyst or DevOps engineer in deploying various services, and monitoring the performance of those services and their respective server computers. Accordingly, via the service deployment and monitoring application, a request may be invoked to generate a server health score for one server computer or a specific pre-defined group of server computers hosting a specific service. In order to generate a server health score utilizing the pre-trained machine learned model 302, the utilization metrics must be obtained from the server computer for which the health score is to be derived. Accordingly, at least with some embodiments, the monitoring application will communicate to each server computer for which a health score is to be derived a request to provide utilization metrics for the server computer. Upon receiving the utilization metrics for a server computer, the values of the utilization metrics are provided as input features to the model 302, which then derives a service-specific health score for the server, as output 304.

With some alternative embodiments, an instance of the pre-trained machine learned model 302 may be deployed to each server computer with which the model 302 is to be used. For example, with some embodiments, the model 302 may be deployed to and reside on the server computer for which the model is used to derive the server health score. As such, after generating a server health score for a server, the server health score for that server may be communicated to an application executing on another server and used as one of several inputs for evaluating one or more rules used in generating proactive recommendations concerning the deployment of a service.

Application Traffic Forecasting

Figure 4:
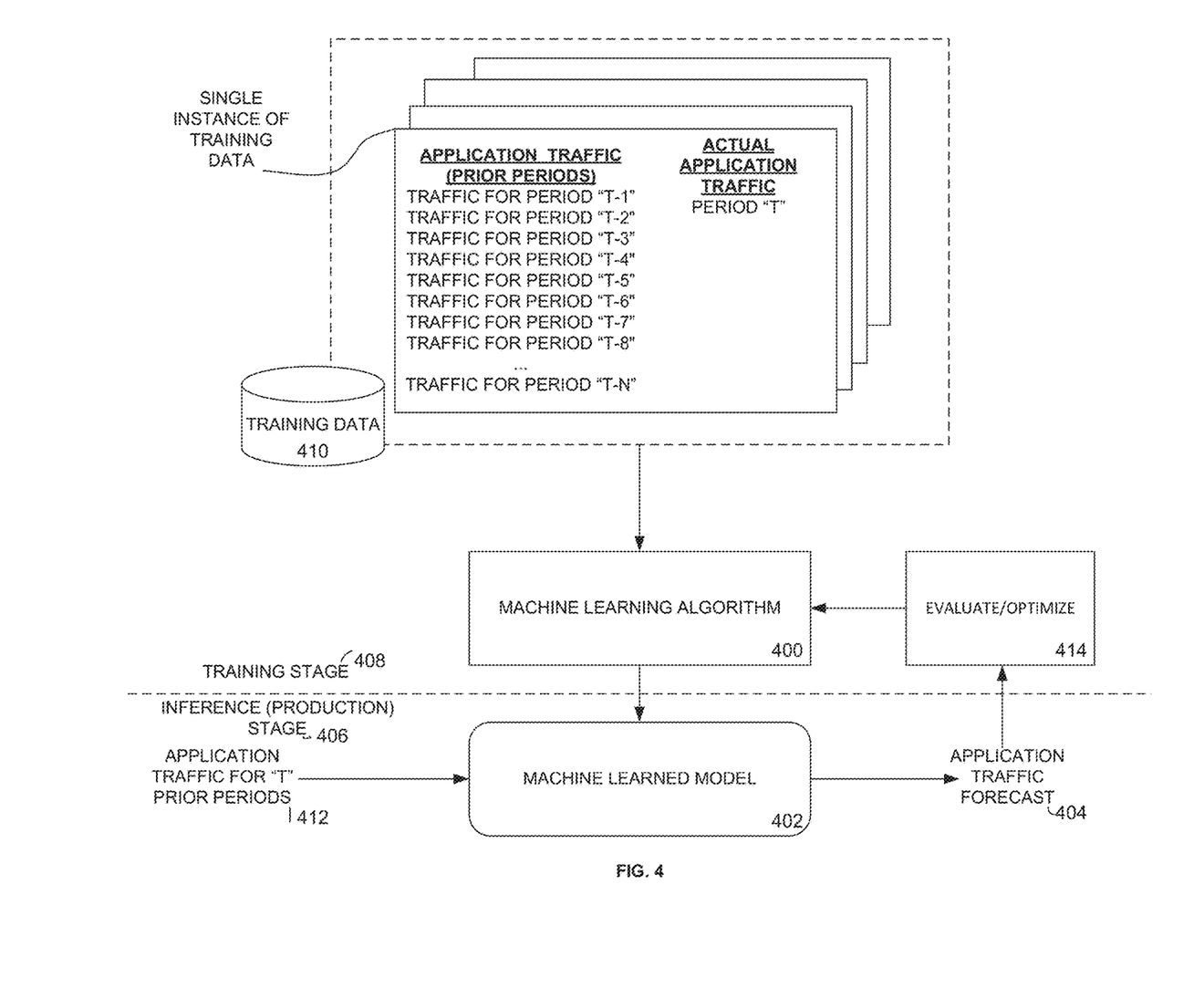
FIG. 4 is a diagram illustrating an example of how a supervised machine learning algorithm may be used to train a second machine learned model to derive as output an application traffic forecast for a group of server computers hosting a specific service, consistent with embodiments of the present invention.

Turning now to FIG. 4, an example of a technique for deriving an application traffic forecast for a group of computers hosting a specific service is illustrated. Here, the group of server computers may be any predefined group of server computers, such as all server computers hosting the same service within the same datacenter, or within two or more datacenters that are part of the same predefined region, and so forth. In this example, the application traffic forecast is derived using a pre-trained machine learned model 402, where the input features for the model 402 are values representing the amount of application traffic that was directed to and processed by the group of server computers hosting a specific service in each of several prior time periods. Here, a time period may be a day, a week, a month, or some other predefined duration of time. Accordingly, the specific technique for deriving the application traffic forecast is a supervised machine learning technique where the type of model may be a statistical time-series forecasting model, or alternatively, a Long-Short-Term Memory (LSTM) model.

As shown in FIG. 4, each instance of training data 410 used in training the model 402 during a training stage 408 includes a value for the amount of traffic directed to a group of server computers in each of several prior time periods, where the time period designated as "T-1" is the most recent time period, followed by the time period designated as "T-2", and so on. Accordingly, in training the model, the objective is to condition the model 402 to output the value for the amount of traffic at time "T" based on the values for the amount of application traffic directed to the group of server computers in prior time periods. During the training stage, after each instance of training data is processed, an evaluation 414 of the output 404 of the model is performed using a loss function, and then the model 402 is updated or modified to improve subsequent predictions. This process is repeated iteratively with individual instances of training data until the model 402 can accurately predict the amount of traffic actually observed in a time period, based on prior time periods.

Although not shown in FIG. 4, with some embodiments, the training data 410 may include additional data from which the application traffic forecast can be predicted. For example, with at least some embodiments, additional data may include but not be limited to: a metric representing a regional count of occurrences of the detection of an illness (e.g., Covid-19, influenza, etc.), a metric indicating a regional count of end-users for another service, and/or a metric representing a regional population.

Once the machine learned model 402 has been trained, the pre-trained machine learned model 402 is deployed in a production stage or setting 406. With some embodiments, the pre-trained machine learned model 402 is deployed to a server computer that hosts a service deployment and monitoring application (e.g., as shown in FIG. 5 and described further below). The service deployment and monitoring application may facilitate various user interfaces and tasks to aid an analyst or DevOps engineer in deploying various services, and monitoring the performance of those services and their respective server computers, as well as the level of application traffic directed to the server computers. Accordingly, via the service deployment and monitoring application, a request may be invoked to generate an application traffic forecast 404 for a specific pre-defined group of server computers hosting a specific service. In order to generate the application traffic forecast, the application traffic directed to the group of server computers for each of several prior time periods is obtained. Upon receiving the input for the model 402, the application traffic for the prior periods is provided as input to the model, which generates as output a predicted level of application traffic 404.

Rules-Based Engine for Service Deployment and Monitoring

FIG. 5 is a diagram illustrating an example of a service deployment and monitoring application 500, having a rules-based engine 502, which may be used to evaluate various rules 504 for the purpose of generating proactive recommendations relating to the deployment of a service, consistent with some embodiments of the present invention. As shown in FIG. 5, at least with some embodiments, the service deployment and monitoring application 500 may reside and execute on a network-accessible server computer, which may be remote from the server computers operating at various datacenters (e.g., 516-A, 516-B, 516-C and 516-N) that host the various services. Accordingly, an end-user (e.g., an analyst or DevOps engineer) may utilize a client computing device 512 to access the application 500 via a network 514, such as the Internet. The application 500 has a user interface component 506 to facilitate the generation and presentation of user interfaces, via which the end-user— using the client computing device 512—can interact with the application 500. With some embodiments, the user interface component 506 may be a web server, such that the end-user may use a web browser application to access the application 500.

Consistent with some embodiments, an end-user of the service deployment and monitoring application 500 may invoke a request to view the operational status (e.g., the health score) of one or more server computers that are hosting a specific service. For example, a request may be invoked to view the operational status of one server computer that is hosting a specific service, the operational status of each server computer in some subset of server computers that are hosting the service, or all server computers at a specific datacenter that are hosting the specific service. Via a user interface, the end-user may specify various parameters when invoking a request. For instance, the end-user may specify the specific service for which the server health scores are to be derived and presented, or the specific group of server computers. When a request is invoked, the application 500 will communicate to each server computer for which a health score is to be derived a request for the values of a set of utilization metrics. With some embodiments, each server computer may process the received request by dynamically generating the values for the set of utilization metrics, for example, in response to the request. However, with some embodiments, each server computer may regularly log values for a set of utilization metrics on a pre-defined schedule, such that the server computer may reply to the request by communicating back to the application 500 the most recently logged values for the set of utilization metrics.

Upon receiving the values for the set of requested utilization metrics from a server, the application 500 will provide the values for the set of utilization metrics to the pre-trained machine learned model 508 to derive, as output, a service-specific server health score for the server. When a service-specific health score for each server computer in the group of server computers has been generated, the health scores are provided as input to the rules-based engine 502, which will use the health scores, in combination with other inputs, when evaluating one or more rules 504, for the purpose of deriving and presenting proactive recommendations relating to the deployment of the service.

In addition to requesting the operational status of one or more server computers, an end-user may invoke a request to derive and have presented an application traffic forecast for a specific group of server computers hosting a specific service. Upon invoking such a request, data relating to historical application traffic volumes are obtained from any one of a variety of networking devices. For instance, the historical data relating to application traffic levels may be stored at a server computer associated with a specific datacenter, or may be accessible from another networking device, such as a load balancing device, a router, and so forth.

Once obtained, the historical application traffic volumes for each of the several prior time periods are provided as input features to the pre-trained machine learned model 510, which generates as output an application traffic forecast for the designated group of server computers. The application traffic forecast may be compared to a baseline volume of application traffic, or a volume of application traffic from an immediately prior time period. Accordingly, at least with some embodiments, the application traffic forecast may be reported as a percentage increase or decrease over some baseline level, or some other prior level of application traffic.

Consistent with some embodiments of the present invention, the service specific health scores and the application traffic forecast are provided as inputs to the rules-based engine 502. The rules-based engine 502 evaluates one or more rules 504 using as inputs to the rules the values of the service-specific server health scores, and/or the application traffic forecast. By way of example, a rule may be established as a combination of conditional statements, such that when one or more conditions evaluate to true or false, a specific recommendation may be presented via the user interface of the application. For example, the evaluation of a rule may result in a recommendation to deploy the service to one or more additional server computers, when, for example, one or more server computers to which the service is currently deployed has a service-specific health score that is above or below some threshold value, and/or when the application traffic forecast for the next time period indicates an expectation of an increase, above a baseline or threshold, by some specified amount. Similarly, the evaluation of a rule may result in a recommendation to remove one or more server computers, when, for example, one or more server computers to which the service is currently deployed has a service-specific health score that is above or below some threshold value, and/or when the application traffic forecast for the next time period indicates an expectation of an increase, above a baseline or threshold, by some specified amount.

With some embodiments, service-specific server health scores and application traffic forecasts are generated in response to an end-user explicitly making a request. However, in other instances, the generating of the server health scores and the application traffic forecast may occur based on a predetermined schedule. Furthermore, although not shown in FIG. 5, the service deployment and monitoring application 500 may include a notification engine for generating notifications that may be communicated to various end-user devices when specific conditions, as set forth in the various rules, evaluate to true or false.

Figure 6:
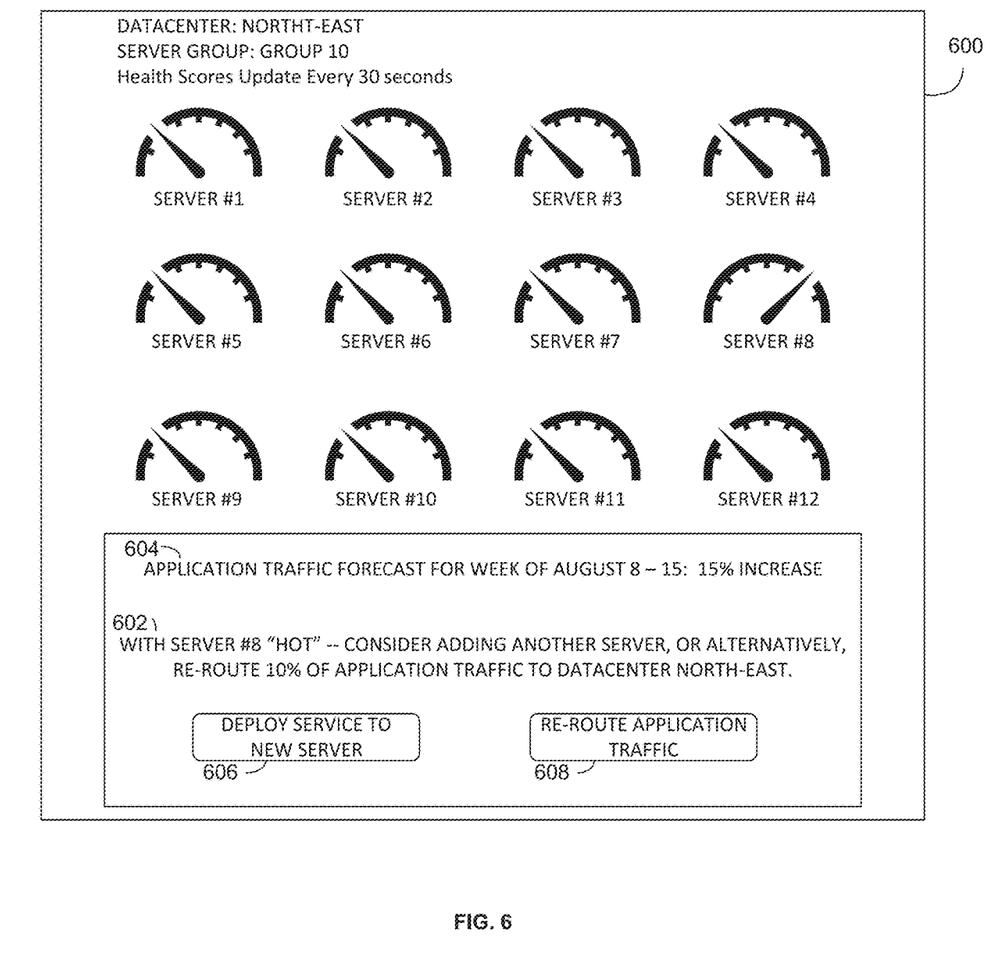
FIG. 6 is a user interface diagram illustrating an example of a dashboard via which one or more proactive recommendations may be presented to an end-user, consistent with some embodiments of the present invention.

FIG. 6 is a user interface diagram illustrating an example of a dashboard 600 via which a proactive recommendation 602 is being presented to an end-user, consistent with some embodiments of the present invention. As illustrated in FIG. 6, the dashboard 600 is presenting for each of several server computers in a group of server computers to which a specific service has been deployed a visual indicator of the "health" of the server computer. In this example, the visual indicator of the health of each server computer is derived based on the service-specific health score and presented as a graphic— specifically, a radial gauge, where the orientation of the needle of the gauge indicates a value that is directly based on the health score derived for the server computer. In this particular example, a lower score represents better health, whereas a higher score is indicative of server-related problems. Accordingly, in this example, a needle pointing to the left indicates a lower overall health score, whereas a needle pointing to the right side of a radial gauge indicates a higher server health score, and thus potential issues with the underlying server computer. However, in alternative embodiments, a high health score may be indicate "good" health, whereas a low health score may indicate "bad health. Furthermore, in various alternative embodiments, any of a wide variety of other types of visual indicators may be used to convey the service-specific health of a server computer.

In addition to a radial gauge corresponding with each server computer in the group of server computers, an application traffic forecast 604 is also presented for the group of server computers. In this example, the application traffic forecast 604 indicates that the expected or anticipated traffic for the following week is to increase by fifteen percent over a baseline level.

Finally, in the example dashboard of FIG. 6, a recommendation 602 is presented. In this example, the recommendation is the result of processing a rule by the rules-based engine, using as inputs the server health scores of the server computers in the group of server computers, and the application traffic forecast. In this example, the recommendation is a suggestion to "consider adding another server, or alternatively, re-route 10% of application traffic to datacenter North-East." In addition to the recommendation itself 602, two user interface elements (e.g., buttons) are presented. A first button 606, when selected, will cause a user interface to be presented to the end-user allowing for the configuration and/or deployment of the service to one or more additional server computers. A second button 608, w % ben selected, will cause a user interface to be presented to the end-user allowing the end-user to reconfigure how application traffic is routed to the server computers hosting the service. Specifically, an end-user may interact with the user interface to re-route some portion of application traffic from one group of server computers to another, or from one datacenter to another.

It will be appreciated that the dashboard user interface 600 shown in FIG. 6 is but one example of how service-specific server health scores may be used to generate a visual indicator of the overall health of a server computer. In alternative embodiments, different types of icons or graphics may be used, including graphics that may be color-coded to reflect ranges of values for a server health score.

Machine and Software Architecture

Figure 7:
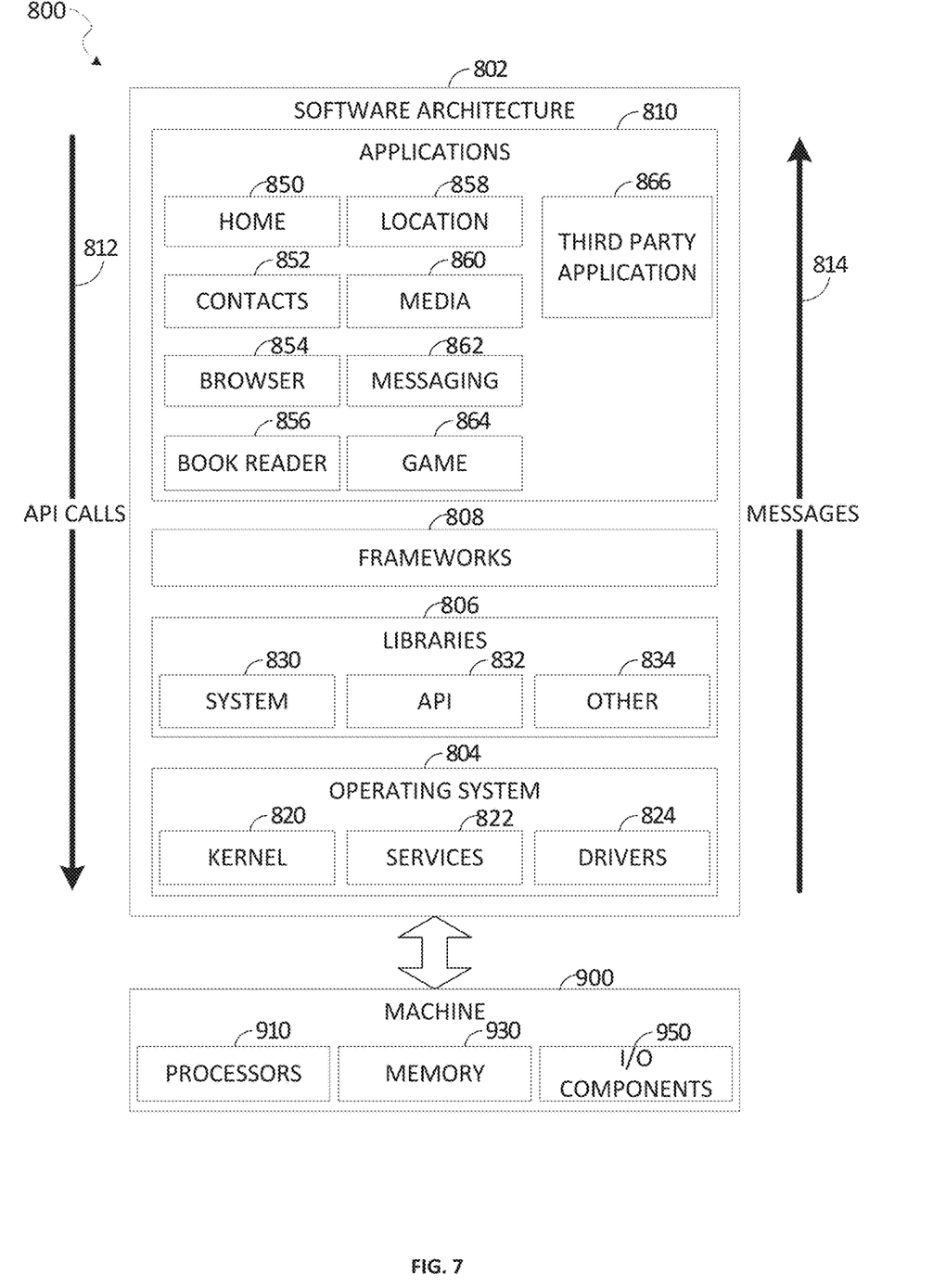
FIG. 7 is a block diagram illustrating a software architecture, which can be installed on any of a variety of computing devices to perform methods consistent with those described herein; and, FIG. 8 illustrates a diagrammatic representation of a machine in the form of a computer system (e.g., a server computer) within which a set of instructions may be executed for causing the machine to perform any one or more of the methodologies discussed herein, according to an example embodiment.

FIG. 7 is a block diagram 800 illustrating a software architecture 802, which can be installed on any of a variety of computing devices to perform methods consistent with those described herein. FIG. 7 is merely a non-limiting example of a software architecture, and it will be appreciated that many other architectures can be implemented to facilitate the functionality described herein. In various embodiments, the software architecture 802 is implemented by hardware such as a machine 900 of FIG. 8 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH™ or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 608 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS™ Phone, or another mobile operating system. In this example, the third-party application 866 can invoke the API calls 812 provided by the operating system 804 to facilitate functionality described herein.

Figure 8:
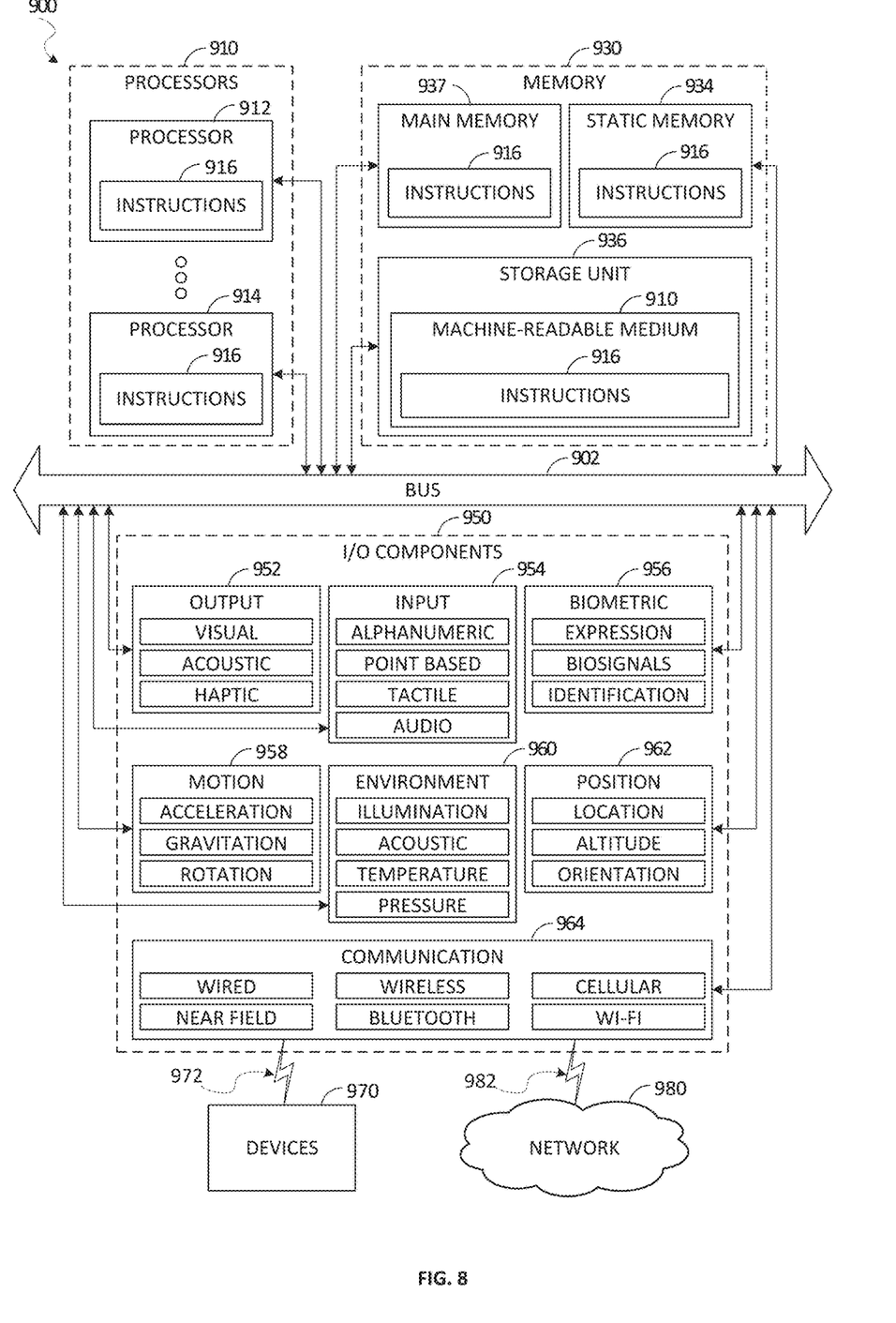

FIG. 8 illustrates a diagrammatic representation of a machine 900 in the form of a computer system within which a set of instructions may be executed for causing the machine to perform any one or more of the methodologies discussed herein, according to an example embodiment. Specifically, FIG. 8 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute any one of the methods or algorithmic techniques described herein. Additionally, or alternatively, the instructions 916 may implement any one of the systems described herein. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 8 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, all accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific V/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 8. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth®, components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417. Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method comprising:
    for each server computer in a predefined group of server computers executing an instance of a first service, i) obtaining for the server computer a value for each of a plurality of utilization metrics, and ii) providing, as input features, the value of each of the plurality of utilization metrics to a first pre-trained machine learning model to derive, as output, a service-specific server health score for the server computer;
    providing, as input features, a measure of application traffic processed by the predefined group of server computers for each of a plurality of prior time periods to a second pre-trained machine learning model to derive, as output, a measure of predicted application traffic to be received by the predefined group of server computers in a future time period;
    processing one or more rules, by a rules-based engine, using as input to the rules-based engine the service-specific server health score for each server computer in the group of server computers executing the instance of the first service and the measure of predicted application traffic;
    presenting, via a user interface, a recommendation relating to the future time period, the recommendation derived at least in part by a result of the processing of the one or more rules; and
    receiving user input via the user interface to invoke an operation consistent with the recommendation relating to the future time period, the operation comprising one of:
    configuration of the first service on one or more additional server computers;
    termination and removal of the first service from one or more server computers; or
    reconfiguration of application traffic routing to the predefined group of server computers.

2. The computer-implemented method of claim 1, further comprising:
    with a supervised machine learning algorithm, generating the first pre-trained machine learning model by training a machine learning model to output a service-specific server health score using a plurality of instances of training data, each instance of training data comprising values for each of a plurality of utilization metrics, as input features, and a value for each of one or more performance metrics, as an output, wherein the values for each of the plurality of utilization metrics were observed proximate in time to the observation of the values for each performance metric.

3. The computer-implemented method of claim 1, further comprising:
    with a supervised machine learning algorithm, generating the second pre-trained machine learning model by training a machine learning model to output a measure of predicted application traffic to be received by the predefined group of server computers in a future time period using a plurality of instances of training data, each instance of training data comprising a measure of application traffic directed to the predefined group of server computers for a first time period and a measure of application traffic directed to the predefined group of server computers for each of a plurality of time periods prior to the first time period.

4. The computer-implemented method of claim 1, wherein processing one or more rules, by a rules-based engine, further comprises:
    processing a rule that results in presentation, via the user interface, of a recommendation to deploy the first service to one or more additional server computers, when a predetermined number of service-specific health scores for server computers executing an instance of the first service cross a threshold.

5. The computer-implemented method of claim 1, wherein processing one or more rules, by a rules-based engine, comprises:
    processing a rule that results in presentation, via the user interface, of a recommendation to deploy the first service to one or more additional server computers, when the measure of predicted application traffic to be received by the predefined group of server computers in a future time period exceeds a predetermined threshold.

6. The computer-implemented method of claim 1, wherein processing one or more rules, by a rules-based engine, further comprises:
    processing a rule that results in presentation, via the user interface, of a recommendation to remove the first service from one or more server computers when the measure of predicted application traffic to be received by the predefined group of server computers in a future time period is less than a predetermined baseline measure of application traffic.

7. The computer-implemented method of claim 1, further comprising:
for each server computer in the predefined group of server computers executing an instance of a first service, presenting via the user interface a visual indicator of the service-specific server health score for the server computer.

8. A system comprising:
one or more processors;
one or more memory storage devices, storing executable instructions, which, when executed by the one or more processors, cause the system to perform operations comprising:
for each server computer in a predefined group of server computers executing an instance of a first service, i) obtaining for the server computer a value for each of a plurality of utilization metrics, and ii) providing, as input features, the value of each of the plurality of utilization metrics to a first pre-trained machine learning model to derive, as output, a service-specific server health score for the server computer;
providing, as input features, a measure of application traffic processed by the predefined group of server computers for each of a plurality of prior time periods to a second pre-trained machine learning model to derive, as output, a measure of predicted application traffic to be received by the predefined group of server computers in a future time period;
processing one or more rules, by a rules-based engine, using as input to the rules-based engine the service-specific server health score for each server computer in the group of server computers executing the instance of the first service and the measure of predicted application traffic; and
presenting, via a user interface, a recommendation relating to the future time period, the recommendation derived at least in part by a result of the processing of the one or more rules; and
receiving user input via the user interface to invoke an operation consistent with the recommendation relating to the future time period, the operation comprising one of:
configuration of the first service on one or more additional server computers;
termination and removal of the first service from one or more server computers; or
reconfiguration of application traffic routing to the predefined group of server computers.

9. The system of claim 8, wherein the operations further comprise:
with a supervised machine learning algorithm, generating the first pre-trained machine learning model by training a machine learning model to output a service-specific server health score using a plurality of instances of training data, each instance of training data comprising values for each of a plurality of utilization metrics, as input features, and a value for each of one or more performance metrics, as an output, wherein the values for each of the plurality of utilization metrics were observed proximate in time to the observation of the values for each performance metric.

10. The system of claim 8, wherein the operations further comprise:
with a supervised machine learning algorithm, generating the second pre-trained machine learning model by training a machine learning model to output a measure of predicted application traffic to be received by the predefined group of server computers in a future time period using a plurality of instances of training data, each instance of training data comprising a measure of application traffic directed to the predefined group of server computers for a first time period and a measure of application traffic directed to the predefined group of server computers for each of a plurality of time periods prior to the first time period.

11. The system of claim 8, wherein processing one or more rules, by a rules-based engine, further comprises:
processing a rule that results in presentation, via the user interface, of a recommendation to deploy the first service to one or more additional server computers, when a predetermined number of service-specific health scores for server computers executing an instance of the first service cross a threshold.

12. The system of claim 8, wherein processing one or more rules, by a rules-based engine, comprises:
processing a rule that results in presentation, via the user interface, of a recommendation to deploy the first service to one or more additional server computers, when the measure of predicted application traffic to be received by the predefined group of server computers in a future time period exceeds a predetermined threshold.

13. The system of claim 8, wherein processing one or more rules, by a rules-based engine, further comprises:
processing a rule that results in presentation, via the user interface, of a recommendation to remove the first service from one or more server computers when the measure of predicted application traffic to be received by the predefined group of server computers in a future time period is less than a predetermined baseline measure of application traffic.

14. The system of claim 8, wherein the operations further comprise:
for each server computer in the predefined group of server computers executing an instance of a first service, presenting via the user interface a visual indicator of the service-specific server health score for the server computer.

15. A non-transitory machine-storage media storing instructions thereon, which, when executed by a processor, cause operations to be performed, the operations comprising:
for each server computer in a predefined group of server computers executing an instance of a first service, means for i) obtaining for the server computer a value for each of a plurality of utilization metrics, and ii) providing, as input features, the value of each of the plurality of utilization metrics to a first pre-trained machine learning model to derive, as output, a service-specific server health score for the server computer,
providing, as input features, a measure of application traffic processed by the predefined group of server computers for each of a plurality of prior time periods to a second pre-trained machine learning model to derive, as output, a measure of predicted application traffic to be received by the predefined group of server computers in a future time period;
processing one or more rules, by a rules-based engine, using as input to the rules-based engine the service-specific server health score for each server computer in the group of server computers executing the instance of the first service and the measure of predicted application traffic; and presenting, via a user interface, a recommendation relating to the future time period, the recommendation derived at least in part by a result of the processing of the one or more rules; and receiving user input via the user interface to invoke an operation consistent with the recommendation relating to the future time period, the operation comprising one of:

configuration of the first service on one or more additional server computers;

termination and removal of the first service from one or more server computers; or reconfiguration of application traffic routing to the predefined group of server computers.

16. The system machine-storage media of claim 15, wherein the operations further comprise:

with a supervised machine learning algorithm, generating the first pre-trained machine learning model by training a machine learning model to output a service-specific server health score using a plurality of instances of training data, each instance of training data comprising values for each of a plurality of utilization metrics, as input features, and a value for each of one or more performance metrics, as an output, wherein the values for each of the plurality of utilization metrics were observed proximate in time to the observation of the values for each performance metric.

17. The machine-storage media of claim 15, wherein the operations further comprise:

with a supervised machine learning algorithm, means for generating the second pre-trained machine learning model by training a machine learning model to output a measure of predicted application traffic to be received by the predefined group of server computers in a future time period using a plurality of instances of training data, each instance of training data comprising a measure of application traffic directed to the predefined group of server computers for a first time period and a measure of application traffic directed to the predefined group of server computers for each of a plurality of time periods prior to the first time period.

18. The system machine-storage media of claim 15, wherein the operations further comprise:

processing a rule that results in presentation, via the user interface, of a recommendation to deploy the first service to one or more additional server computers, when a predetermined number of service-specific health scores for server computers executing an instance of the first service cross a threshold.

19. The system machine-storage media of claim 15, wherein the operations further comprise:

processing a rule that results in presentation, via the user interface, of a recommendation to deploy the first service to one or more additional server computers, when the measure of predicted application traffic to be received by the predefined group of server computers in a future time period exceeds a predetermined threshold.

20. The machine-storage media of claim 15, wherein the operations further comprise:

processing a rule that results in presentation, via the user interface, of a recommendation to remove the first service from one or more server computers when the measure of predicted application traffic to be received by the predefined group of server computers in a future time period is less than a predetermined baseline measure of application traffic.

* * * * *